US008719397B2

(12) United States Patent  
Levi et al.

(10) Patent No.: US 8,719,397 B2
(45) Date of Patent: May 6, 2014

(54) METHOD AND SYSTEM FOR EMAIL AND PIM SYNCHRONIZATION AND UPDATING

(75) Inventors: Moshe Levi, Tel Aviv (IL); Moshe Dgani, Holon (IL)

(73) Assignee: Emoze Ltd., Tel Aviv (IL)

( * ) Notice: Subject to any disclaimer, the term of this patent is extended or adjusted under 35 U.S.C. 154(b) by 814 days.

(21) Appl. No.: 11/687,748

(22) Filed: Mar. 19, 2007

(65) Prior Publication Data

US 2007/0208803 A1    Sep. 6, 2007

Related U.S. Application Data

(63) Continuation-in-part of application No. 11/266,541, filed on Nov. 3, 2005.

(51) Int. Cl.
G06F 15/173    (2006.01)

(52) U.S. Cl.
USPC .......................................... 709/224; 709/206

(58) Field of Classification Search
USPC ......... 709/223–227, 238, 206, 217, 230, 237; 340/2.8; 370/219; 379/93.01
See application file for complete search history.

(56) References Cited

U.S. PATENT DOCUMENTS

| 5,625,670 | A | 4/1997 | Campana, Jr. et al. |
| 6,249,807 | B1* | 6/2001 | Shaw et al. .................... 709/206 |
| 7,310,532 | B2* | 12/2007 | Knauerhase et al. ...... 455/456.1 |
| 7,519,708 | B2* | 4/2009 | Malik ........................... 709/225 |
| 7,590,629 | B2* | 9/2009 | Sahinoja et al. ..................... 1/1 |
| 7,725,584 | B1* | 5/2010 | Hanmann et al. .............. 709/227 |
| 7,809,380 | B2* | 10/2010 | Zabawskyj et al. ......... 455/456.3 |
| 7,962,448 | B2* | 6/2011 | Creamer et al. ............... 707/611 |
| 8,176,086 | B2* | 5/2012 | John et al. ...................... 707/802 |
| 2002/0032722 | A1 | 3/2002 | Baynes, Jr. et al. |
| 2002/0111995 | A1* | 8/2002 | Mansour et al. .............. 709/203 |
| 2002/0131395 | A1* | 9/2002 | Wang ............................ 370/349 |
| 2003/0018714 | A1* | 1/2003 | Mikhailov et al. ............ 709/203 |
| 2003/0046434 | A1* | 3/2003 | Flanagin et al. .............. 709/248 |
| 2003/0154110 | A1* | 8/2003 | Walter et al. ...................... 705/3 |
| 2003/0157947 | A1* | 8/2003 | Fiatal et al. .................... 455/466 |
| 2003/0225797 | A1* | 12/2003 | Shields et al. ................. 707/202 |
| 2004/0052212 | A1* | 3/2004 | Baillargeon .................. 370/235 |
| 2004/0093342 | A1* | 5/2004 | Arbo et al. ..................... 707/102 |
| 2004/0177253 | A1* | 9/2004 | Wu et al. ....................... 713/176 |
| 2004/0185834 | A1* | 9/2004 | Sommers et al. .......... 455/414.1 |
| 2004/0203766 | A1* | 10/2004 | Jenniges et al. ........... 455/435.1 |
| 2004/0254993 | A1* | 12/2004 | Mamas ......................... 709/206 |

(Continued)

FOREIGN PATENT DOCUMENTS

| EP | 000001401176 | 11/2007 |
| WO | WO9963709 | 12/1999 |

(Continued)

*Primary Examiner* — Saleh Najjar
*Assistant Examiner* — Eric W Shepperd
(74) *Attorney, Agent, or Firm* — Soroker-Agmon

(57) ABSTRACT

A system for sending data from at least one computing device, which may be an email server, located at a user location, to a plurality of handsets. The system includes an internal system monitor associated with the at least one computing device, and the monitor provides application connectors deployed at the user location. The system also includes at least one wireless gateway router and a mobile client, which provides a client infrastructure installed on the plurality of handsets, such that the at least one computing device acts uni-directionally and thereby provides secure delivery of the data.

10 Claims, 11 Drawing Sheets

(56) References Cited

U.S. PATENT DOCUMENTS

| | | | |
|---|---|---|---|
| 2005/0033812 A1* | 2/2005 | McCarthy et al. | 709/206 |
| 2005/0228895 A1* | 10/2005 | Karunamurthy et al. | 709/229 |
| 2005/0251557 A1* | 11/2005 | Yoshizawa et al. | 709/206 |
| 2005/0288006 A1* | 12/2005 | Apfel | 455/418 |
| 2006/0026588 A1* | 2/2006 | Illowsky et al. | 717/171 |
| 2006/0041687 A1* | 2/2006 | Caspi et al. | 709/248 |
| 2006/0084451 A1 | 4/2006 | Garnero et al. | |
| 2006/0136517 A1* | 6/2006 | Creamer et al. | 707/204 |
| 2006/0149814 A1* | 7/2006 | Borella | 709/204 |
| 2006/0195629 A1* | 8/2006 | Sharma et al. | 710/30 |
| 2006/0224620 A1* | 10/2006 | Silverman et al. | 707/104.1 |
| 2007/0021110 A1* | 1/2007 | Chaudhri et al. | 455/418 |
| 2007/0078968 A1* | 4/2007 | Kelley et al. | 709/224 |

FOREIGN PATENT DOCUMENTS

| | | |
|---|---|---|
| WO | WO03036887 | 5/2003 |
| WO | WO2005020503 | 5/2005 |
| WO | WO2006077283 | 7/2006 |

* cited by examiner

ମETHOD AND SYSTEM FOR EMAIL AND
PIM SYNCHRONIZATION AND UPDATING

RELATED APPLICATION

This application is a continuation-in-part of application number U.S. Ser. No. 11/266,541, titled "Method and System for an Uncompromising Connection from a Computing Device Having Information Storage Like Email Server to a Wireless Mobile Device," filed 3 Nov. 2005, which is incorporated herein by reference.

FIELD OF THE INVENTION

The present invention generally relates to wireless communication and in particular to a method and system for wireless communication from a computing device having information storage to a mobile device.

BACKGROUND OF THE INVENTION

FIG. 1 is a prior art schematic diagram graphically representing communications from an email server to a wireless mobile device. The BlackBerry Enterprise Server (BES) in prior art FIG. 1 initiates connections to the wireless network in an outbound direction. To support the BlackBerry wireless email solution in a firewall environment:

1. The firewall must be configured to allow computers within the company that are running the BlackBerry Enterprise Server to initiate TCP/IP connections to an outside server listening on port 3101; and 2. The BlackBerry servers keep messages transferred from the internal corporate server.

Thus, communication must be able to take place into and out of the corporate firewall 110.

"5-Message queues on the BlackBerry Infrastructure: Messages have been forwarded from the BlackBerry Enterprise Server and are waiting for the BlackBerry Infrastructure to process and deliver them to the BlackBerry Wireless Handhelds™."

U.S. Pat. No. 5,625,670 by Campana, et al, assigned to NTP Corp., similarly to Blackberry, discloses an electronic mail system with RF communications to mobile processors. A system for transmitting information from one of a plurality of originating processors A-N to at least a plurality of destination processors (A-N) which may be transported during operation in accordance with the invention includes at least one gateway switch, a gateway switch storing information received from one of the at least one originating processor prior to transmission of the information to the at least one destination processor; a RF information transmission network for transmitting stored information received from one of the at least one gateway switch, by RF transmission to at least one destination processor; at least one interface switch, an interface switch connecting a gateway switch to the RF transmission network and transmitting stored information received from one of the at least one gateway switch to the RF information transmission network; and wherein the information is transmitted to a receiving interface switch by the electronic mail system in response to an address of the receiving interface switch which has been added to the information originated by the originating processor by either the originating processor or gateway switch and the information is transmitted from the receiving interface switch to the RF information transmission network with an address of the destination processor to receive the information which has been added by either the originating processor, a gateway switch or the receiving interface switch.

Thus, it would be advantageous to have a method and a system to provide for uncompromising communication between an email server and a wireless mobile device.

SUMMARY OF THE INVENTION

Accordingly, it is a principle object of the present invention to provide Push Message technology as a solution that connects a wide range of mobile devices, as well as from PC to PC, including Pocket PC's, SmartPhones, Palm OS devices, Symbian and data storage computing devices such as database servers, file servers and email servers, including Microsoft Exchange, Lotus Domino, POP3, and POP3/IMAP and Webmail clients. The present invention enables users of mobile devices to access their Email, Calendar, Contacts, Notes and Task List.

It is a further principle object of the present invention to assure that no information is stored on the wireless gateway.

It is another principle object of the present invention to provide a data-center server that acts only as a router and does not hold the email messages that are sent.

It is yet another object of the present invention to provide a method and a platform with an Internet connection over encrypted HTTP, port 80, HTTPS port 443, or any other port that is supported on the data-center server.

It is still another object of the present invention to provide a method and a platform with just-in-time routing when both devices are connected.

It is one more object of the present invention to provide a method and a platform that saves battery time.

It is still yet another object of the present invention to provide a method and a platform that saves airtime costs.

It is one other object of the present invention to provide a method and a platform with no local server.

By adding a Plug-in to the internal system monitor the present invention provides a platform and a method to allow remote users to fully synchronize and Push various data types like: files, database information, images, audio, video, etc, in addition to the electronic mailbox (inbox, inbox sub-folders, drafts, sent items) and other Personal Information Manager (PIM) applications—calendar, contacts and tasks.

Synchronize and Push from the supported mobile devices is done as follows:
Authentication of users via existing infrastructure—no additional user management and administration is required.
Transferring of all data as encrypted communication using AES, or as free text according to user's preference.
Synchronization of email attachments, while allowing user to filter out attachments according to size/file type rules.

A system is disclosed for sending data from at least one computing device, which may be an email server, located at a user location, to a plurality of handsets. The system includes an internal system monitor associated with the at least one computing device, and the monitor provides application connectors deployed at the user location. The system also includes at least one wireless gateway router and a mobile client, which provides a client infrastructure installed on the plurality of handsets, such that the at least one computing device acts uni-directionally and thereby provides secure delivery of the data.

Messages and data from the corporate or Internet Service Provider (ISP) messaging server are being monitored constantly by a thin component installed behind the corporate/ home firewall. As the device moves in and out of wireless coverage areas, connections to the server are established to send and receive information.

The present invention provides an end-to-end system that enables organizations or individuals to synchronize email, and other personal information (such as calendar, contacts and tasks) for mobile workers who access the Internet using mobile devices (PDA's, smart-phones and other devices).

The system uses industry standard communication protocols for delivery of information to various classes of mobile devices. The system is based on carrier-class data centers that will host the proprietary servers that provide mediation between proprietary clients (mobile devices) and customer personal computers or organization networks. Access to corporate email and groupware services is accomplished by specialized probes for MS Exchange/Lotus Domino servers that are installed within the customer corporate network or on personal computers.

The platform features are as follows:

The platform provides an efficient framework for push data to mobile phones and synchronizes any type of information between computers, PDA's, smart phones, etc. The system has no synchronization sessions and is reliable due to its symmetric nature, therefore it can withstand network errors, data loss, sudden aborts, etc.—when any new/changed item is marked as synchronized it is guaranteed to be synchronized.

For modularity the platform provides an application layer and an infrastructure layer, where the application layer uses the API's of the infrastructure layer to perform operations such as authentication, authorization, management, compression, encryption, etc.

Third parties can build their own applications on top of the platform to provide their unique services and extend it to any source type.

Synchronization is network-layer independent and can be performed with other reliable and unreliable protocols.

Emoze implements end-to-end information security and maximum network and mobile defense. The Emoze security is ensured by both advanced technology (AES-128), and a shared encryption key.

The platform is designed to be modular and cross-platform. Data encryption, compression or other transforms can be easily added.

The platform resolves update conflicts using priority levels, which should be assigned to each computer that participates in the synchronization.

The platform supports a hierarchy of items and ensures that parent-child relationships will be synchronized too.

The platform implements a restrictions mechanism, which excludes certain items from synchronization, according the item properties.

Data encryption, compression or other transforms can be easily added.

Data representation and encapsulation is proprietary.

The mobile client features are as follows:

Outstanding performance optimization;

Lightning speed adaptation for new devices/platforms;

Fully complies the protocol and APIs provided in the emoze platform—works with the PC Connector and Central Server for mail and PIM data push;

Generic, cross-platform code using encapsulated OS specific services;

Makes porting to future platforms easier;

Modular code design: support for new data sources can be easily added; and

Platform agnostic ("play anywhere").

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF AN EXEMPLARY EMBODIMENT

The principles and operation of a method and a system according to the present invention may be better understood with reference to the drawings and the accompanying description, it being understood that these drawings are given for illustrative purposes only and are not meant to be limiting.

Figure 1:
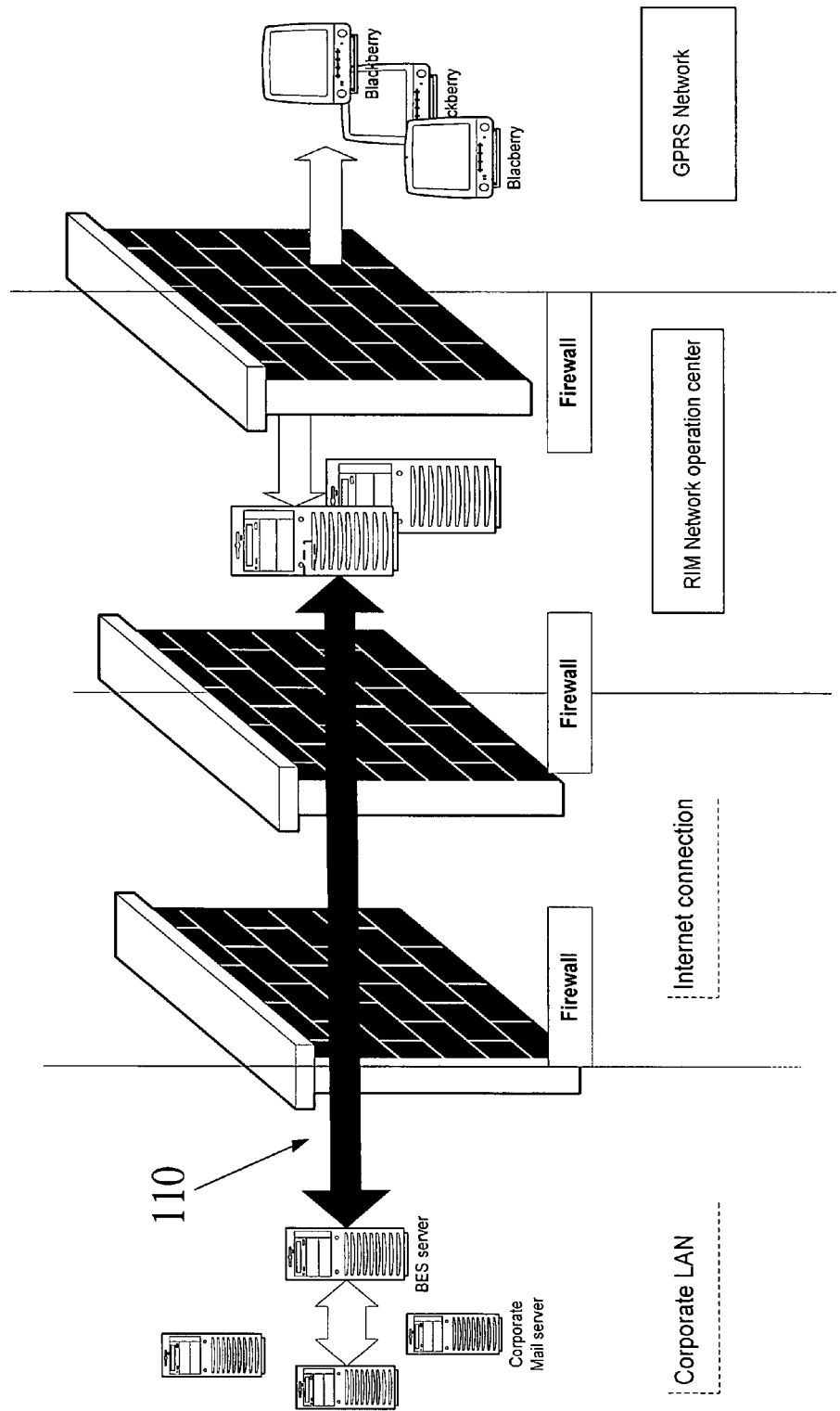
FIG. 1 is a prior art schematic diagram graphically representing communications from an email server to a wireless mobile device.
Figure 2:
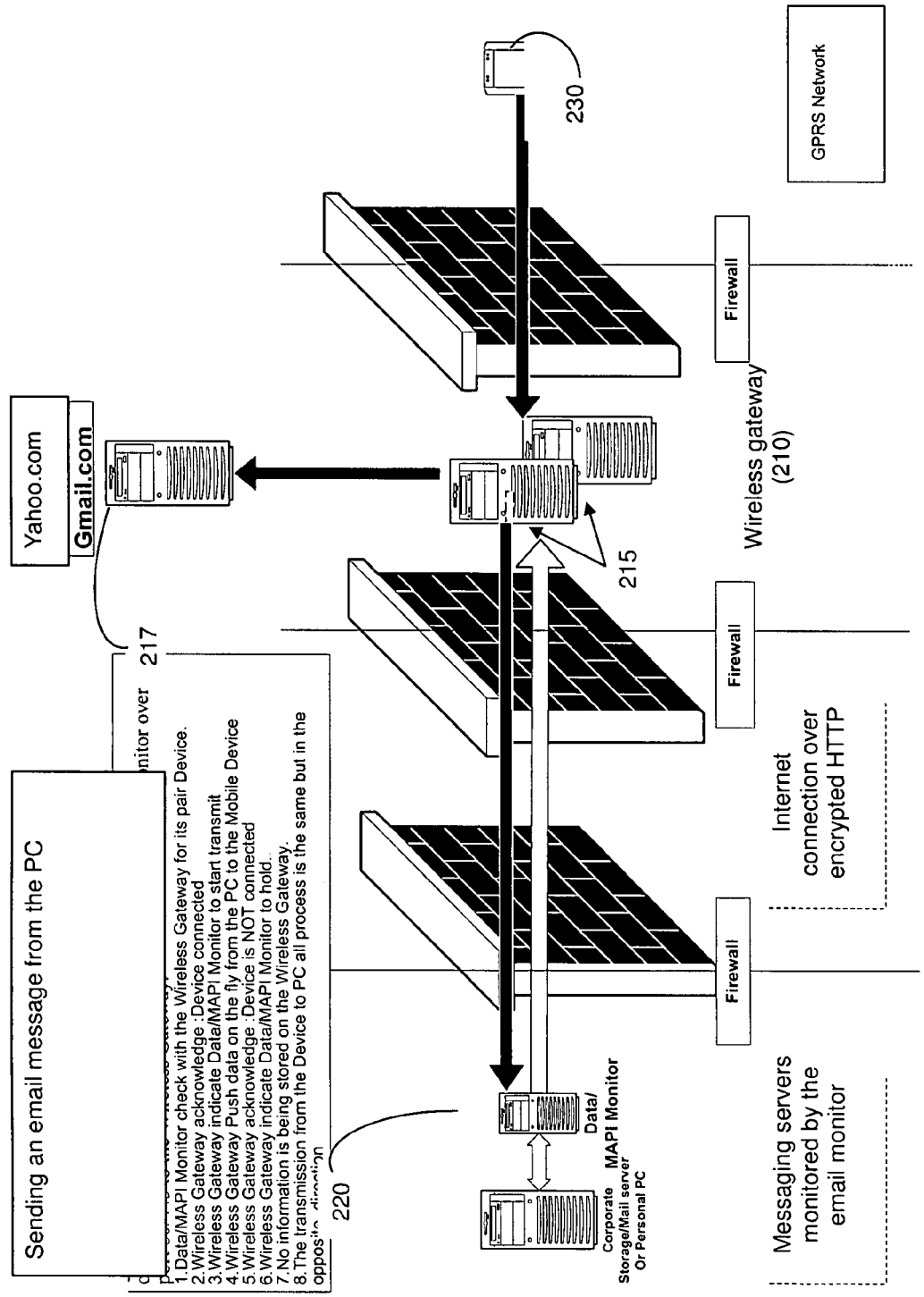
FIG. 2 is a schematic diagram graphically representing communications from an email server to a wireless mobile device, constructed according to the principles of the present invention.

FIG. 2 is a schematic diagram of the system components for communications from an email server to a wireless mobile device, constructed according to the principles of the present invention. The system includes the following major proprietary components:

Wireless gateways 210, which provide a Webmail messaging system; data-center servers 215 provide Webmail accounts and wireless gateway 210 Pulls a Webmail account and Pushes Data to the Webmail public server 217, which may be, for example, Yahoo! Or Hotmail;

An internal system monitor 220, which provides application connectors deployed at customer organizations; and A mobile client 230, which provides a client infrastructure installed on a handheld device, such as a cellphone, PDA, PC, laptop or any computing device.

Wireless gateway 210 includes fully redundant, carrier class server software and acts as intermediary between the customer organization and mobile clients 230. Clients connect to wireless gateway 210 whenever they are connected to the Internet and wish to sync. Organization connectors connect to wireless gateway 210 whenever they discover new information that is available for Clients and wish to send it over.

Wireless gateway 210 communicates with all types of clients (both mobile clients and enterprise Connectors) using encrypted communications over port 80 or port 443, to be able to traverse enterprise Firewalls or personal Firewalls without the need for Firewall policy change.

Wireless gateway 210 does not store any messages in transit between the desktop PC and the mobile device. Wireless gateway 210 acts solely as a router, which means that at any given moment wireless gateway 210 does not store any incoming or outgoing data. This is in contrast to other wireless messaging systems which implement a store and forward mechanism.

In addition to the above guidelines, wireless gateway 210 includes the following major features:

Licensing and access control—wireless gateway 210 serves only registered customers.

Management and configuration—wireless gateway 210 allow easy configuration of all operative parameters that will be stored in backend database.

SNMP support for management notifications and commands such as hot configuration change will be added.

Redundancy and Balancing—wireless gateway 210 is fully redundant and load-balancing is achieved using any industry standard load-balancer.

Load endurance—each wireless gateway 210 supports up to 10,000 simultaneous connections per server, and up to 25 Mb per second of data traffic (5,000 email messages of average size 5,000 bytes), on a dual-CPU (e.g., Intel Xeon) server with 1 Gb of RAM and a 1 Gigabit NIC.

Internal system monitor 220 enables mobile access to various enterprise resources such as mail servers, groupware servers and Web-sites.

The following list details the Connectors for various applications and a brief description of each:

Exchange Connector

The system supports Exchange servers from version 5.5. The Connector is an email interface client and is installed on a stand-alone server within the organization. No configuration/installation of the Exchange server is required, and there is no configuration on the enterprise firewall (assuming it allows outgoing Port 80 or 443 traffic).

Domino Connector

The system supports Domino servers from version R5. The Connector uses Domino SDK's and is installed on a stand-alone server within the organization. No configuration/installation of the Domino server is required, and there is no configuration on the enterprise firewall (assuming it allows outgoing Port 80 traffic).

Yahoo.com Connector (Web Access Connector)

The system supports extraction/sending of email messages Calendar and Contacts only from a mail.yahoo.com account.

Web Based Connector Email Clients

A flexible infrastructure allows extracting the information from Web-based email clients. Included are connectors for Outlook Web Access, Lotus Web Access gmail, Hotmail, etc.

POP3/IMAP Connector

The system supports any POP3/IMAP data source with all supported options (timeout, encryption, secure authentication, etc.).

Figure 3:
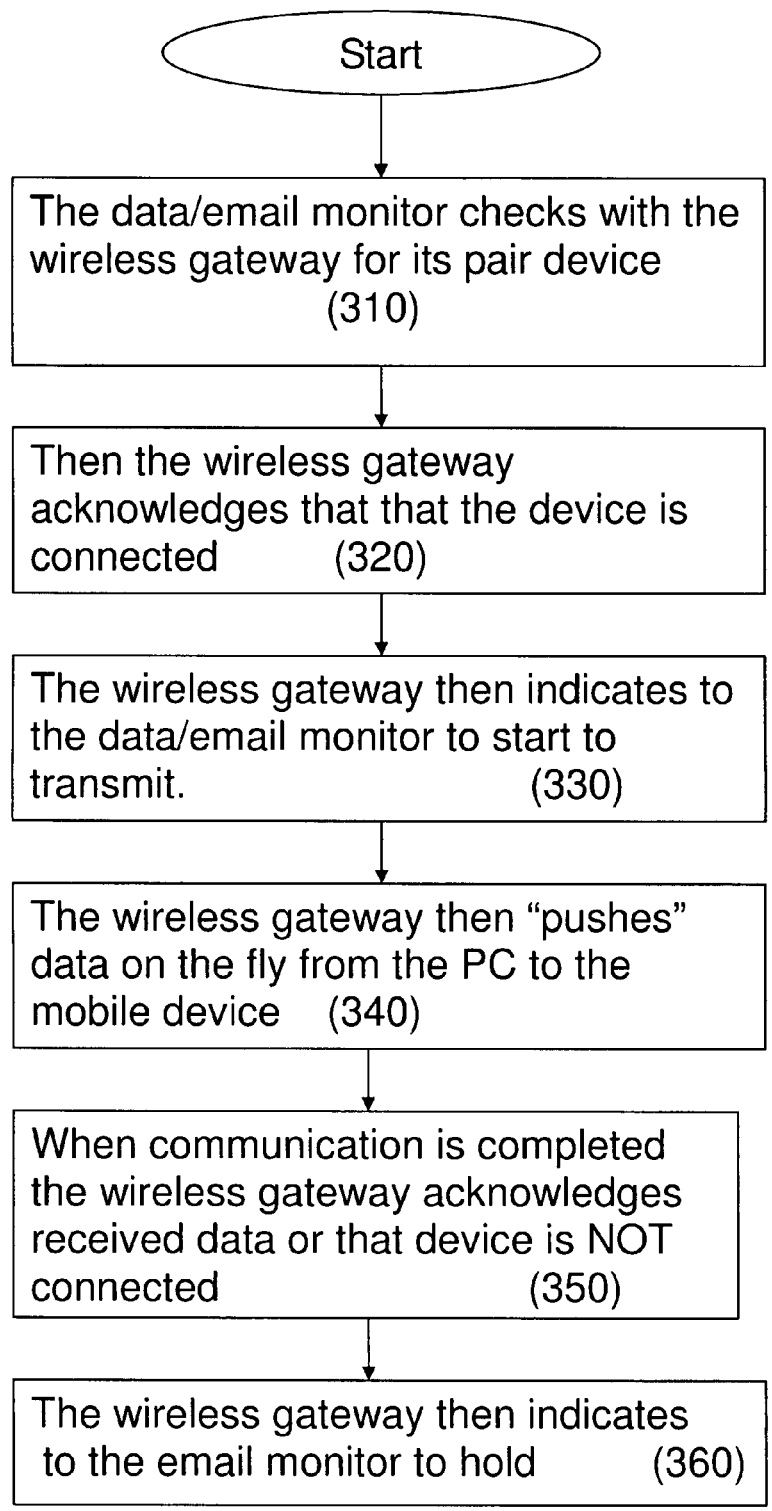
FIG. 3 is a flow chart representing communications from an email server to a wireless mobile device, according to an exemplary embodiment of the present invention.

FIG. 3 is a flow chart representing communications from an email server to a wireless mobile device, according to an exemplary embodiment of the present invention. The communication is in the form of an email message from a PC over a persistent connection initiated by an internal system monitor via port 80 to the wireless gateway. First the internal monitor checks with the wireless gateway for its pair device 310. Then the wireless gateway acknowledges that the device is connected 320. The wireless gateway then indicates to the internal system monitor to start to transmit 330. The wireless gateway then "pushes" data on the fly from the PC to the mobile device 340. Subsequently, when either side of the communication peers (mobile device or PC) is not connected, the wireless gateway acknowledges that the device is NOT connected 350 and the wireless gateway then indicates to the internal system monitor to hold 360. For transmission from the wireless device to the PC all the processing is the same, but in the opposite direction.

Figure 4:
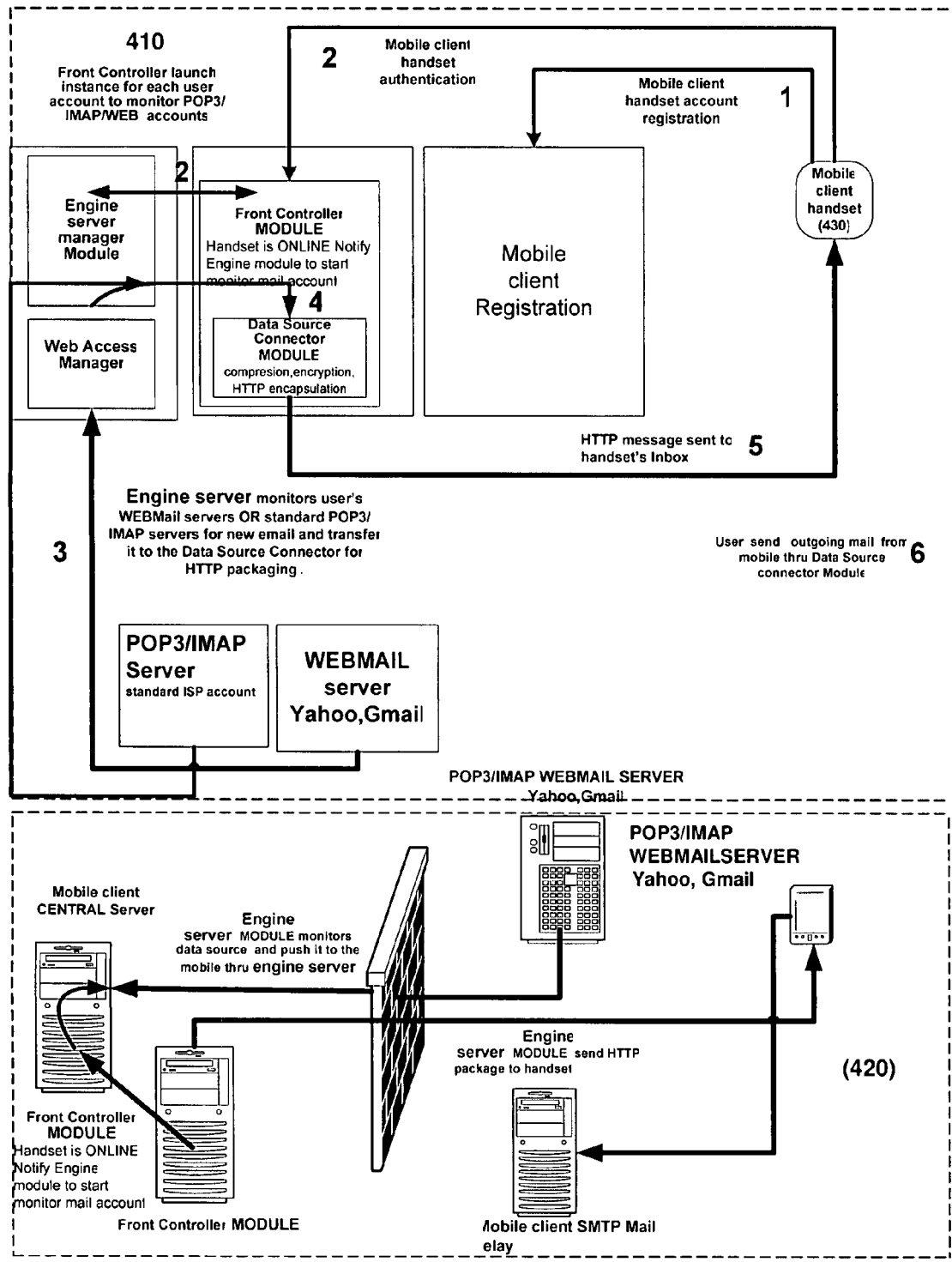
FIG. 4 is a flow diagram representing The POP3/IMAP/WEB central server, according to an exemplary embodiment of the present invention.

FIG. 4 is a flow diagram representing the Central server 410, according to an exemplary embodiment of the present invention. Thus, the present invention does not use a local server.

Central server 410 is responsible for monitoring email accounts using HTTP/HTTPS or POP3/IMAP protocols. Module 420 functions as a gateway, which translates requests to Web requests and vice versa. This is in order to get access to the Webmail account and pull new messages from the Inbox and other folders. Central server 410 interacts with module 420 in case the connected mobile device requested during the registration process to push the user's mail from his Webmail account, such as Yahoo, Gmail etc.

a. The mobile client handset 430 authenticates and connects to the wireless gateway.
b. The wireless gateway queries the Registration database to get user account information: user/password/
c. Central server 410 is notified by the wireless gateway once a mobile device gets On-Line.

The notification message comprises the user's account information.

d. Upon receiving notification, Central server 410 starts an instance of the Engine for the particular user/handset.
e. Central server 410 monitors the POP3 or WEBMAIL account at configurable interval. For efficiency—in any case a Webmail or other data source exposes notification methods—the central server knows to use them to notify clients for updates, instead of the periodic monitoring.
f. Central server 410 establishes a TCP connection with module 420 or with the remote WEB server or POP3/IMAP host that was defined by the user during the registration process.

Figure 5:
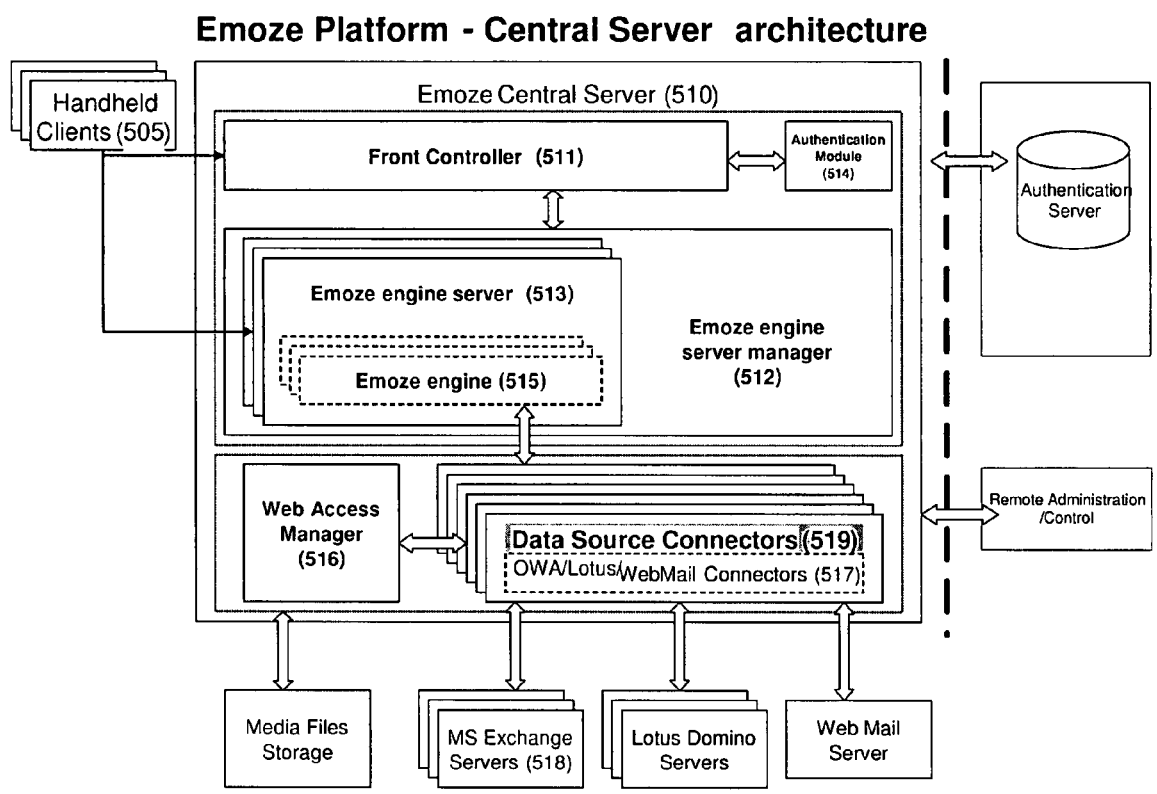
FIG. 5 is a schematic diagram graphically representing the Central Server Architecture of the Emoze Platform, constructed according to the principles of the present invention.

FIG. 5 is a schematic diagram graphically representing the Emoze Central Server (ECS) Architecture of the Emoze Platform, constructed according to the principles of the present invention. The server module 510 of the ECS comprises:

A Front Controller 511 (one instance);
An Emoze Engine Server Manager 512 (one instance);
An Emoze Engine Server 513 (multiply instance); and
An authentication module 514 (one instance)

Summary:

Emoze Engine Server Manager 512 contains a pool of Emoze Engine Server 513 instances. Each Emoze Engine Server 513 works in a separate thread and serves multiple instances of the client 505.

Front Controller 511 also works in a separate thread. Front Controller 511 awaits incoming connections from new clients 505.

The number of Emoze Engine Servers 513 and the number of clients 505 for each Emoze Engine Server 513 are configurable parameters.

Figure 6:
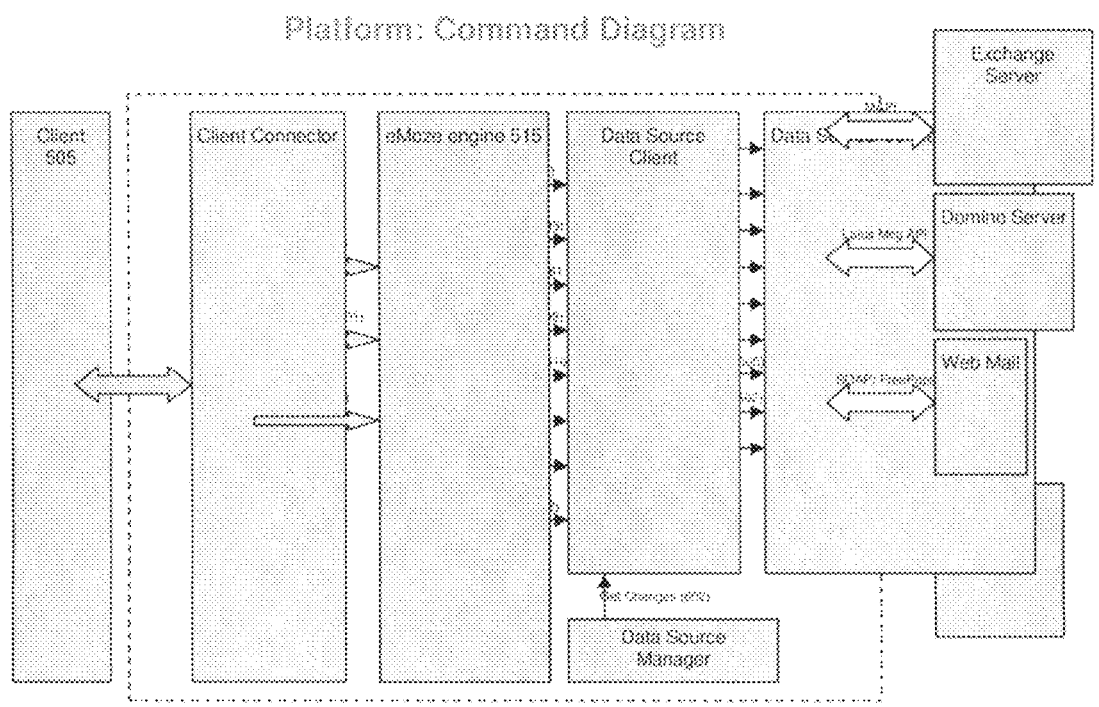
FIG. 6 is a schematic diagram graphically representing the Command Diagram of the Emoze Platform, constructed according to the principles of the present invention.

FIG. 6 is a schematic diagram graphically representing the Command Diagram of the Emoze Platform, constructed according to the principles of the present invention. FIG. 6 shows paths of command from client to server after the authentication stage. (Some of the following reference blocks appear either in FIG. 5 as 5xx or in FIG. 6 as 6xx or both as 5xx)

Exemplary Client 505 Procedure:

First Stage:

Each client 505 that connected to the ECS in the first stage works with a Front Controller 511.

Front Controller 511 accepts the incoming connection from the client 505 if at least one copy of Emoze Engine Server 513 can work with new clients 505 or responds to client 505 that Server 513 is BUSY.

Second Stage:

If the connection is accepted, Front Controller 511 passes an authentication procedure to Authentication module 514 and Authentication module 514 returns all necessary information about client 505 for connection to Web Access Storage 516 or returns that client 505 is not authorized.

Third Stage:

After successful authentication and obtaining all necessary information about the client 505 Front Controller 511 passes client 505 to Emoze Engine Server Manager 512.

Emoze Engine Server Manager 512 then creates an instance of Emoze Engine 515 for client 505, initializes Emoze Engine 515 with client 505's properties and corresponding socket and passes Emoze Engine 515 to least loaded Emoze Engine Server 513.

Fourth Stage:

In this stage client 505 and Emoze Engine Server 513 are synchronized for content from both sides. Emoze Engine Server 513 periodically calls the DoLogic 601 procedure for each serviced Emoze Engine 515 and checks the Result of this operation. If client 505 is disconnected or an Error occurred, Emoze Engine Server 513 destroys the instance of Emoze Engine 515 for this client 505 and closes the socket.

Summary:

Each Emoze Engine 515, which works with Web Access Data Source, contains a Web Access Connector instance. The Web Access Connector provides the necessary functionality for Emoze Engine 515 (Get Database, Get Item, Add Item, etc.).

A specific Web Access Connector generated for specific Web Access Data Source (for example, the Web Access Connector for MS Exchange Outlook Web Access is different that the Web Access Connector for Gmail).

Web Access Connector works with the engine in two ways, synchronously and asynchronously.

When working with Web Access Data Source—the Web Access Connector periodically polls the Data Source (for example the MS Exchange server 518) and obtains information about changes (for example the MS Exchange server 518). This is done asynchronously in separate threads. Emoze Engine 515 can get the result of this task by a Get Changes 602 procedure, and the information will be taken very quickly. If Emoze Engine 515 wants to make some changes on the Web Access Data Source (create, update, delete items) the Web Access Connector does the operation synchronously in an Emoze Engine 515 thread.

It is the Web Access Manager's responsibility to manage Connector objects (send commands to the client to do all asynchronous operations and to correctly destroy the object it Emoze Engine 515 is destroyed).

Exemplary Emoze Engine 515 procedure for working with the Outlook Web Access (OWA) module:

First Stage:

When Emoze Engine 515 is created it also creates an object called OWAImpl. The OWAImpl object contains an OWA client module.

Emoze Engine 515 calls an Init procedure 603 and the OWA client module is initialized with information about the client (login/password to MS Exchange server 518, URI to root folder etc.).

Second Stage:

Emoze Engine 515 calls a SetFolder procedure 604.

In this stage Emoze Engine 515 and the OWA client negotiate about shared folders. Also, the client starts taking information about items on MS Exchange server 518 for shared folders.

Third Stage:

Emoze Engine 515 calls GetDatabase 605. The OWA client returns to Emoze Engine 515 all items from all shared folders if they are already taken. In return Emoze Engine 515 gets a BUSY result.

Forth Stage:

Emoze Engine 515 periodically calls GetChanges 602 and GetDigest 607 to obtain information about changes on MS Exchange server 518.

Emoze Engine 515 calls GetItem 608 to take items if changes occurred or Emoze Engine 515 wants to get full information about items from MS Exchange server 518.

Fifth Stage:

If Emoze Engine 515 receives a request from a handheld client 505 to make changes on an instance of MS Exchange server 518, it calls a corresponding method (CommandAdd 609, CommandDelete 610, CommandUpdate 611) and awaits the result of this operation.

Sixth Stage:

If handheld client 505 is disconnected from MS Exchange server 518 and Emoze Engine 515 is deleted, the OWA client is also deleted, if it is not busy and not working with MS Exchange server 518 in a separate thread. Otherwise the OWA manager waits while the thread finishes and then deletes the OWA client.

Supported Data Sources of the Emoze platform include:
Exchange Server:
  Microsoft Exchange 5.5;
  Microsoft Exchange 2000;
  Microsoft Exchange 2003;
Lotus Server:
  IBM Lotus Notes 5.0.6;
  IBM Lotus Notes 6.0 & 6.5;
  IBM Lotus Notes 7.0;
Web Access Data Sources:
  Outlook Web Access;
  Lotus Web Access
  Hotmail;
  Gmail;
  Yahoo!Mail
Other Data Sources:
  POP3 Mail Servers;
  IMAP Mail Servers;

The Emoze Platform Personal Computer (PC) Connector Application is configured as follows:
  The PC Connector is a PC application which exploits the Emoze platform to provide mobile push service for Outlook and Lotus Notes users.
  The PC Connector provides handlers to support common mail application data sources such as:
    Microsoft Office Outlook 2000, 2002 (XP);
    Microsoft Office Outlook 2003;
    IBM Lotus Notes 5.0.6 or higher;
    IBM Lotus Notes 6.0/6.5/7.0.

Figure 7:
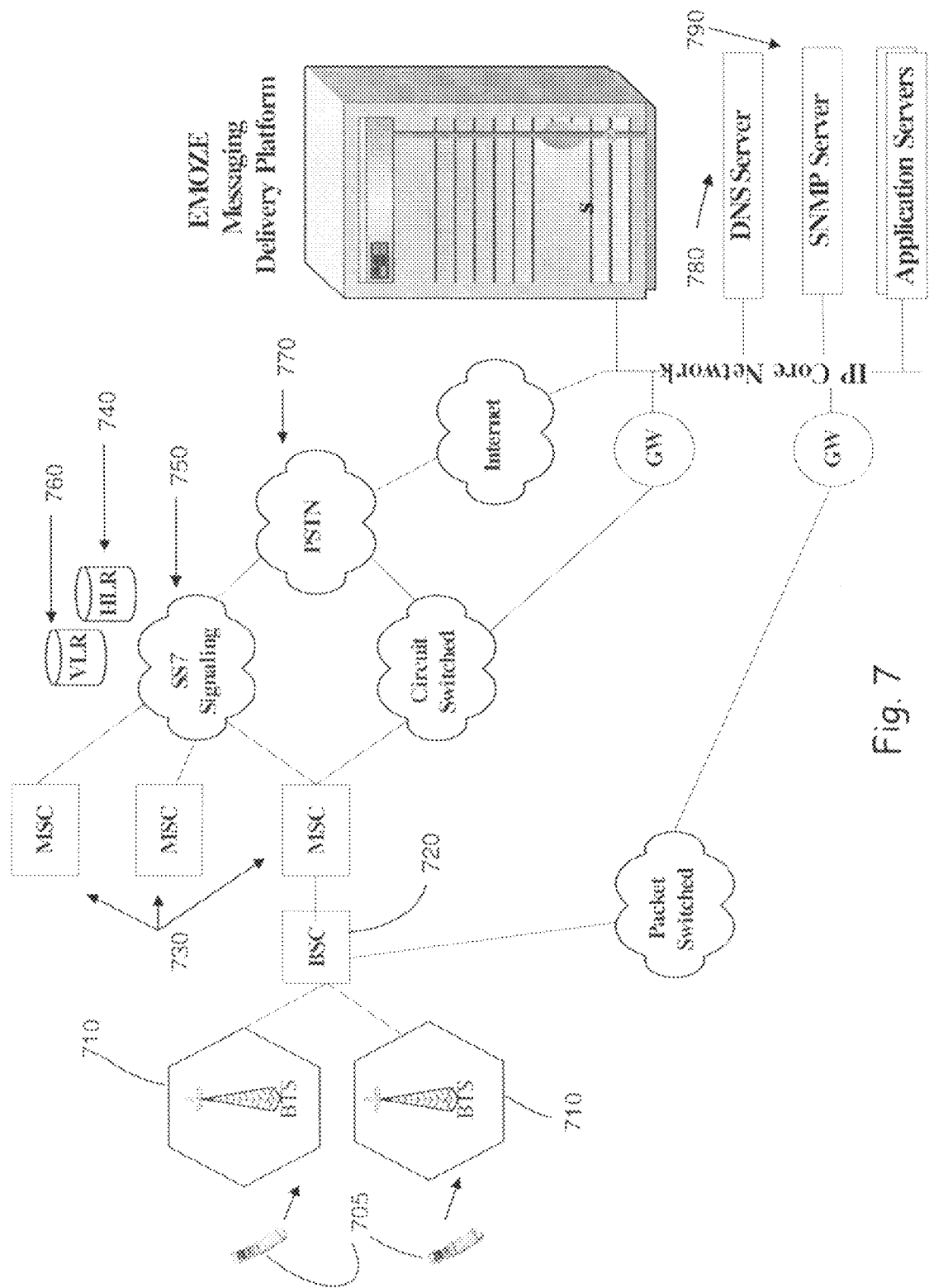
FIG. 7 is a schematic block diagram illustrating System Integration/Network Location of the Emoze Platform, constructed according to the principles of the present invention.

FIG. 7 is a schematic block diagram illustrating System Integration/Network Location of the Emoze Platform, constructed according to the principles of the present invention. Signals from handheld clients 705 are received by Base Transceiver Stations (BTS's) 710, the equipment in a Global System for Mobile Communications (GSM) network that is used to transmit radio frequencies over the air waves. The Base Station Controller (BSC) 720 is equipment that manages radio resources in a GSM network (e.g., BTS's 710).

The Mobile Switching Centers (MSC's) 730 are the switching centers in the mobile wireless network. Home Location Register (HLR) 740 is a permanent SS7 database used in cellular networks to identify the subscriber, identify features or services subscribed, and track the current location of the mobile subscriber. Signaling System 7 (SS7) 750 is the industry-standard protocol for routing phone calls, both wireless and wireline. The Visitor Location Register (VLR) 760 is a local database maintained by the cellular provider in whose territory the mobile subscriber is roaming.

The Public Switched Telephone Network (PSTN) 770 is a local and long distance telephone communication system in the public domain. The Domain Naming System (DNS) 780 is a mechanism for translating host computer names to Internet Protocol (IP) the addresses so users are not required to remember the IP address but a name instead. The Simple Network Management Protocol (SNMP) server 790 is a common method by which network management applications can query a management agent using a supported management information base.

Figure 8:
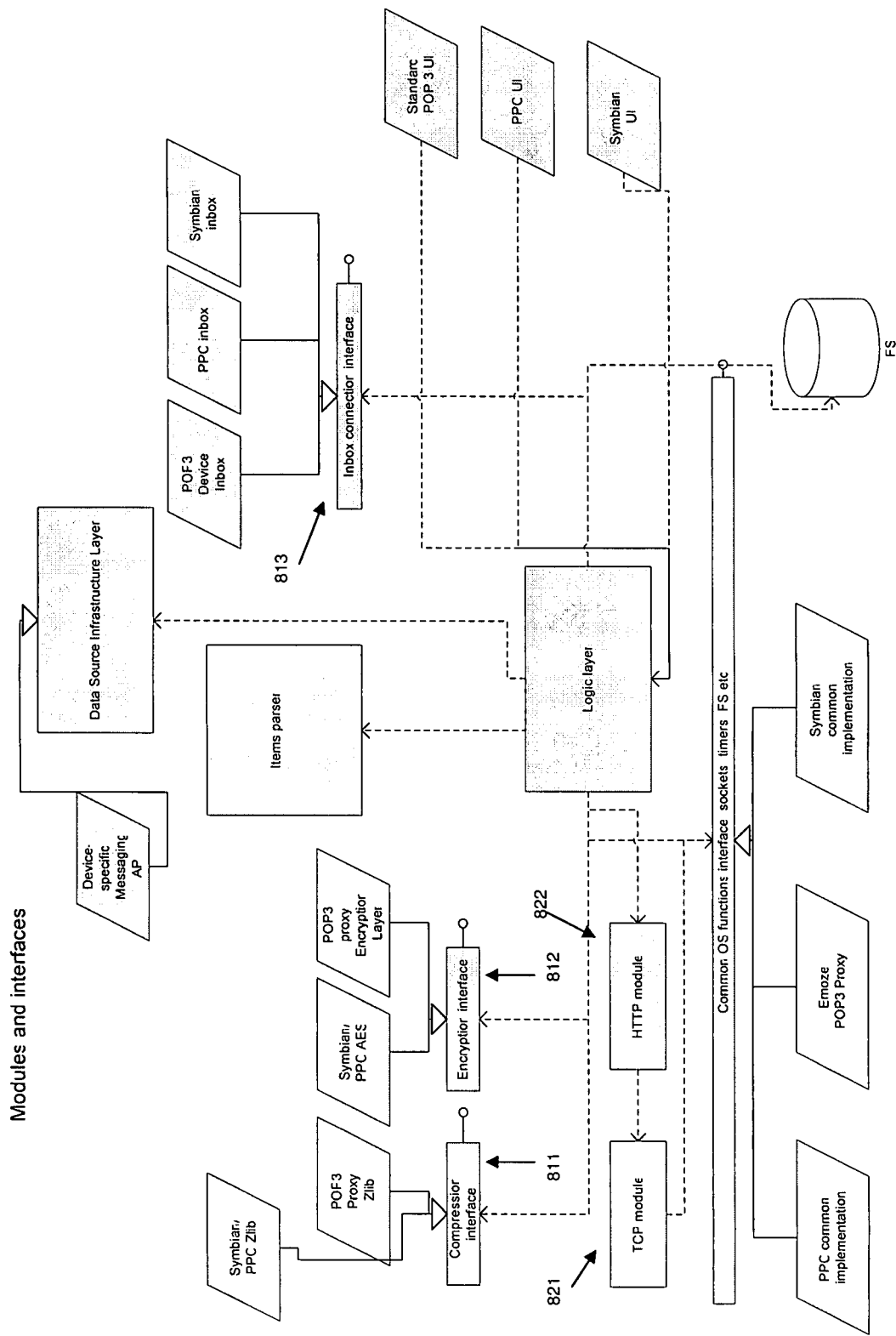
FIG. 8 is a schematic block diagram illustrating the modules and interfaces of the client architecture, constructed according to the principles of the present invention.

FIG. 8 is a schematic block diagram illustrating the modules and interfaces of the client architecture, constructed according to the principles of the present invention. Interfaces include the compression interface 811, the encryption interface 812 and the inbox connection interface 813. Modules include the Transmission Control Protocol (TCP) module 821 and the HyperText Transfer Protocol (HTTP) module 822. HTTP is the protocol for moving hypertext files across the Internet. This requires an HTTP client program on one end, and an HTTP server program on the other end.

Figure 9:
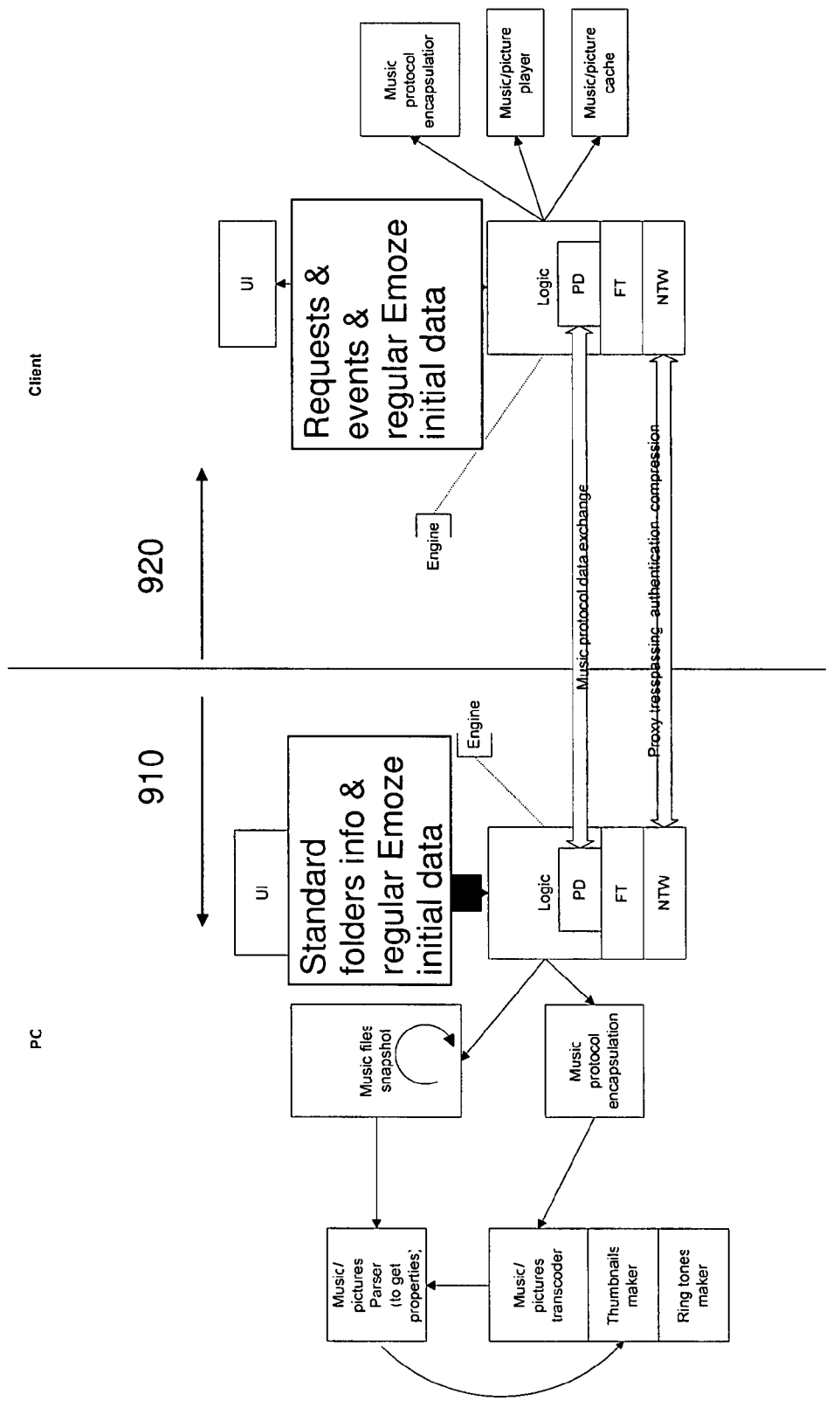
FIG. 9 is a schematic block diagram illustrating the relationship between the PC module and the client module, constructed according to the principles of the present invention.

Supported Mobile Devices Include:
POP3 solution+vCard & vCAL (emoze "light")
Any device with a built-in POP3/SMTP client (emoze "light").
  Partial list for supported devices:
    Motorola RAZR V3
    Nokia 6215i
    Motorola MOTOKRZR K1m
    Motorola RAZR V3c w/LBS
    Motorola RAZR V3m
    Blackberry 7250
    Blackberry 8703e
Any Brew enabled device with 3rd party email client (e.g. "My Mobile Mail" or "Email executive")
  LG VX4400, VX6000, VX4600, VX4500, VX7000, VX4700, VX4650
  Samsung SCH-a610, SCH-a650, SCH-a790, SCH-a530, SCH-a670
  Kyocera 3035e, SE47, KX1,
  Motorola T720, C343, v710,
  Audiovox CDM-9500, CDM-8600, CDM-8900, CDM-8615, CDM-8910
  Nokia 3589i FIG. 9 is a schematic block diagram illustrating the relationship between the PC module 910 and the client module 920, constructed according to the principles of the present invention. PC module 910 handles standard folders information and regular Emoze initial data, while client module 920 handles requests and events, as well as regular Emoze initial data.

Figure 10:
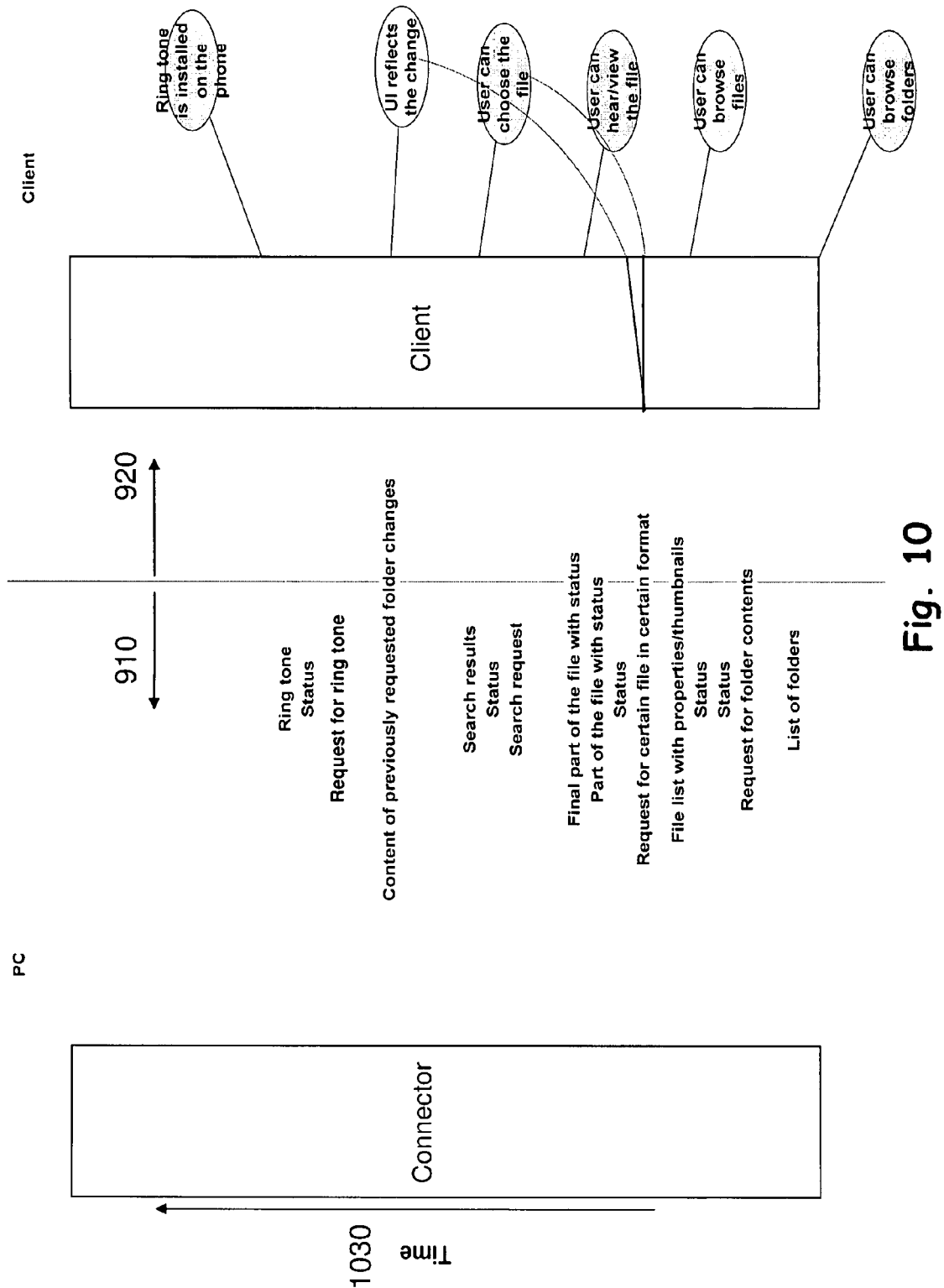
FIG. 10 is a schematic block diagram illustrating a data exchange example between the PC module and the client module of FIG. 9, constructed according to the principles of the present invention.

FIG. 10 is a schematic block diagram illustrating a data exchange example between the PC modules 910 and the client modules 920 of FIG. 9 over Time 1030, constructed according to the principles of the present invention.

Figure 11:
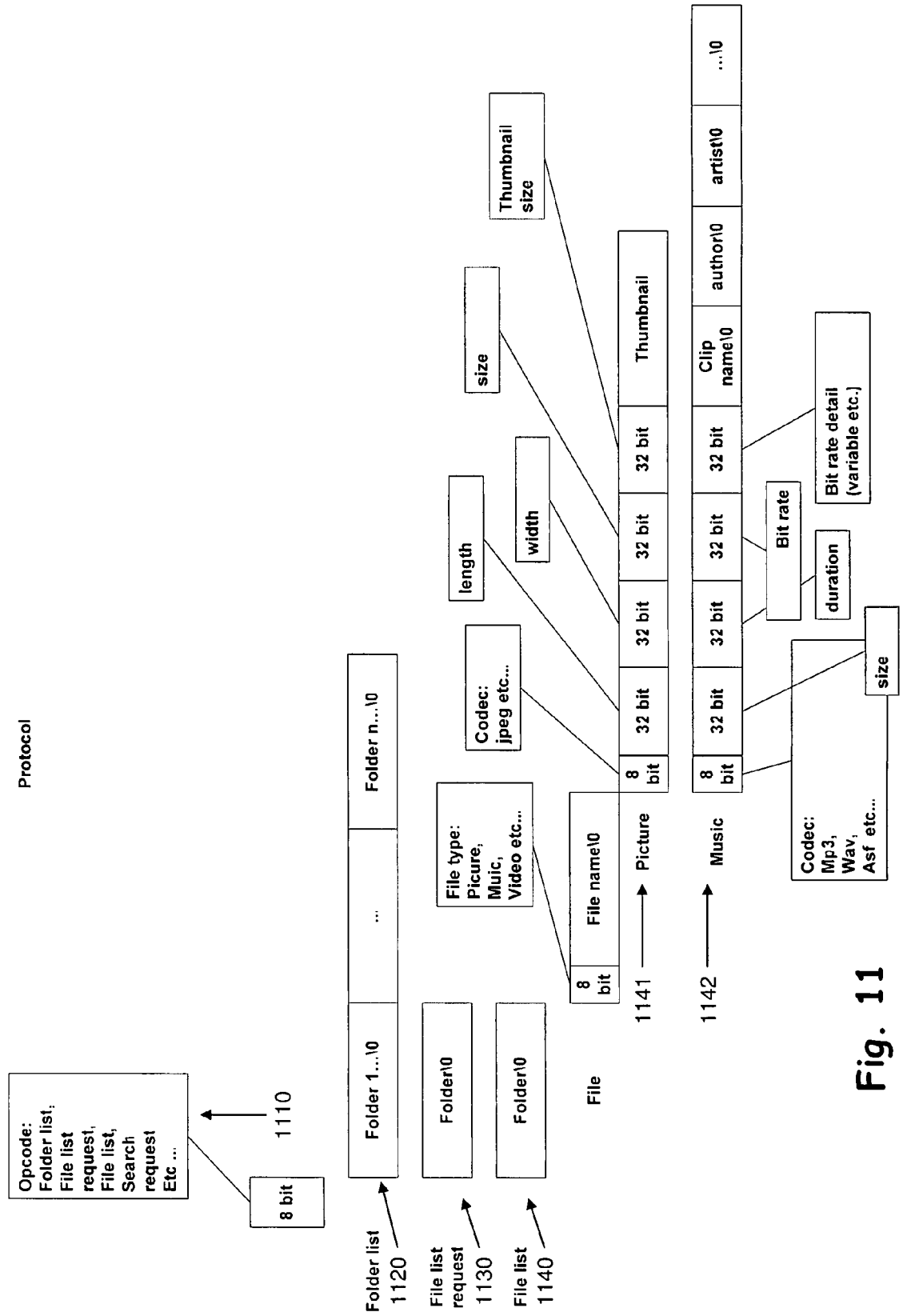
FIG. 11 is a schematic diagram illustrating the protocol for instructions used to request folders and files, constructed according to the principles of the present invention.

FIG. 11 is a schematic diagram illustrating the protocol for instructions used to request folders and files, constructed according to the principles of the present invention. The 8-bit opcode 1110 can specify a folder list 1120, a file list request 1130, a file list 1140, a search request, etc. A file in file list 1140 can be for a picture 1141 or music 1142, for example.

The present invention also provides the following exemplary, non-limiting features:

1.1.1 General
  1.1.1.1 Email and Personal Information Manager (PIM) synchronization—The full portfolio of email and PIM applications is updated. The data synchronized includes the following:
    Email (Inbox, Inbox subfolders, Drafts, Sent Items)
    Contacts (Including Lotus Notes contact sync)
    Calendar
    Tasks or To-Do List
    Phone contacts—all the existing phone contacts are copied to the Contact folder in the mail client.
  1.1.1.2 Inbox and their subfolders are synced.
  1.1.1.3 Email Attachment Handling—Email attachments often present challenges to the handheld device due to size and file format. The Client offers a variety of options for intelligently managing the delivery of Email attachments. Email attachments can be turned off and on, and attachments delivered can be filtered by size and by file format.
    Download attachment on demand—Email attachments can be downloaded even if the Email attachment setting is turned off. This feature is very useful, especially in minimizing the network traffic and hence reducing the cellular data traffic costs.
  1.1.1.4 Meeting Requests—Users are able to view requests in their calendar, and send updates or notices related to a meeting. Emoze offers full support for this functionality, with some device-specific limitations inherent to particular platforms.
  1.1.1.5 Read Mark Management—Emoze supports full synchronization of read marks.
  1.1.1.6 Recurring meetings, including Exceptions (for the next release)—Emoze Client stores recurring calendar and task entries accurately in the intended manner, including very complex recurrence and exceptions to the recurring entries. Some competitive products do not have this capability, but instead they expand the single recurring record on the server into multiple records on the handheld. Thus, if a user wants to move a recurring calendar entry on their handheld, they would need to move every single instance. This is not the case with Emoze.
  1.1.1.7 Attachments only on demand—Users are informed of attachments that have been filtered out, and can choose to override the filters for individual attachments that they wish to see.
  1.1.1.8 Delete management on device—The user has two options: the first (default), wherein deletions made on the device do not delete on the PC side; and the second option, wherein deletions on the device delete also on the PC side.

1.1.1.9 Conflict resolution—on slow sync, an intelligent merge is done to avoid duplicates.

1.1.1.10 Calendar conflict—The user has 3 options: 1 Leave untouched; 2 server wins; and 3 device wins.

1.1.1.11 Manage Folders, creation and deletion.

1.1.2 Supported mail sources 1.1.2.1 Microsoft Outlook on PC's.

1.1.2.2 Lotus Notes on PC's.

1.1.2.3 Exchange 5.5 Exchange 2000/2003.

1.1.2.4 Domino R5, R6.X, R7.

The present invention provides a user-friendly, seamless, enjoyable User Experience 1.1.2.5 Push—mail is pushed to the user. The user does not pull the e-mails.

1.1.2.6 Periodically—The user can change the push option and make the updates periodically.

1.1.2.7 Calendar and Task Sync Settings—Calendar and task data does not typically consume much bandwidth, however initial calendar loads on a device can take some time if unfiltered. Emoze allows calendar and task entries to be filtered for a set number of days forward and backward (1 month, 3 months or 6 months).

1.1.2.8 Email truncation—Email can be truncated if the message body exceeds a certain length.

1.1.2.9 Profile Settings—there is a wide variety of configuration settings that govern the system behavior. These can be very individualized or very standardized depending on the degree of administrative control desired. These profile settings can be dynamically adjusted by users to meet their changing needs, protect limited device storage, affect session lengths, or deal with different connectivity modes. For instance, a user may opt not to sync attachments desiring the quickest possible sync time. More detail about profile settings is described in the administrative tools section below.

1.1.2.10 Notification of new e-mail and PIM—The user is notified when a new email arrives, not when email becomes unread or moved to a different folder; this applies only to new email and new PIM.

1.1.2.11 Wireless feature optimizes compression—Communications between the server and client are compressed to protect bandwidth and minimize connect times. For email, both the message body and any attachments are compressed. Because compression of very small units of information may actually decrease communications efficiency, Emoze Client selectively compresses based on the size of the communication. In addition, the information is pre-compressed at a high level instead of breaking it up into packets and then compressing. This results in much more bandwidth-efficient communication.

1.1.2.12 First Slow sync transferred in installation—The first sync is very large, all the information needs to be transferred. Instead of doing it Over-The-Air, Emoze can be configured to send the information during the installation through the USB or Bluetooth connection, saving time and data transfer costs.

1.1.2.13 Broken connection restart—Mobile communications can be unreliable with frequent line drops. Emoze Client uses session restart to minimize the impact of dropped lines. The server keeps track of the last acknowledged message, and resumes transmission where it left off. This has great usability implications and ensures more cost-efficient communications.

1.1.2.14 Multiple Connection Modes—As today's mobile worker logs more and more time away from the office LAN connections, multiple device connection modes need to be supported. The dual profile feature is especially valuable where users will switch frequently between connection methods. The Emoze Client supports all of the following methods:

Wireless public networks (GSM, GPRS, CDPD, TDMA, CDMA, etc.) • Wireless LAN (i.e. 802.11)

Bluetooth

PC Cradle (leveraging the PC network connection)

Wireline modem

Wireless phone attached to handheld

Automatic Wireless Connection Management—When the Emoze Client application synchronizes with the server, it first checks for an available network connection. If one is not found, it automatically initiates a network connection if possible. The Emoze client will attempt to transmit data to its peer only if the peer client is connected.

Automatic cleanup from device—user option whether to have his Email automatically cleaned up off the device after it reaches the configurable age limit or number of messages.

1.1.2.15 View Connection History—The end user has access to the synchronization logs on their device. This is helpful for confirming expected information arrived, and facilitates troubleshooting. For instance, if a wireless connection drops mid-sync, Emoze will inform the user of the specific problem so that user knows to just re-sync. Competitive products offer less useful generic updates such as "Session Complete with Errors." In this scenario, such an approach would likely confuse the user, who is spared by the present invention from a call into the helpdesk unnecessarily.

1.1.2.16 Save battery mode—Emoze will switch to Save battery mode once the battery reaches configurable threshold on the device.

In this case network connectivity will be suspended in order to reduce battery consumption to allow the basic functionality of the handset, such as for incoming/outgoing phone calls.

1.1.2.17 Ease of Installation—The installation process for the client software is user-friendly. Even if technical staff are able to pre-configure devices, it is fairly common for a device to drain its battery erasing all memory. Thus, it is important for the client-side sync software to be easy to install. With Emoze, the client install routine can be posted just a click away on the Intranet site. After the hands-off install routine runs, the user enters his user name and password, and is ready to sync the device.

1.1.2.18 Session Control—The end user needs to have a view into the sync session as it happens, as well as having some basic controls. Emoze offers status messages during the sync session and a cancel button to end the sync session if desired. The client software also includes a byte counter that is updated throughout the session.

1.1.3 Unmatched Level of Security

Emoze implements end-to-end information security and maximum network and mobile defense. Emoze's Military Grade security standard includes protection of the internal network and of the mobile device, using AES-128 encryption for fully-secured transmission.

The security is ensured by both advanced technology (AES-128), and shared encryption key. The latter means that only the sending and receiving parties can read the data. All messages are encrypted behind one's firewall (either home or corporate network), and can be decrypted only when they reach the right mobile device or PC. Encryption keys are stored in the user's mobile device and PC. All data and any encryption key, are never accessible within the public network or over any wireless network architecture for the enterprise or personal users behind a firewall standard HTTP/HTTPS port required to connect to the Wireless data center.

Corporate server characteristics.

User Authentication—The present invention offers its own internal user authentication capability. In addition, existing authentication options can also be leveraged. This approach decreases administrative overhead and also imposes less burden on end users. Even if existing authentication options are used, the internal capability can be useful for testing. Note that multiple methods can be used simultaneously, though for each user only one method is used. The following forms of authentication are supported:

LDAP authentication
NT domain authentication
Domino authentication
Emblaze Doors authentication User Disablement—Administrators are able to "turn off" a specific user, user group, or device. For example, they may turnoff the account of a stolen device so that no unauthorized persons are able to sync with company servers.

Encryption Options—allows administrators to select the encryption options that best meets their needs for balancing level of security with communications efficiency. Administrators may assign different encryption options to different profiles. The following standard options are available:

Triple DES not used
AES
No encryption

Credential Expiration Options—System administrators can prevent storage of network credentials on the device by forcing users to enter password each time they connect to the network to sync. To support more frequent synchronization including automatic synchronization, there is also an option to allow credentials to be stored for a configurable length of time. In this case, the actual user password is required during the first synchronization, and after successful connection the encrypted user credentials (but not the actual password) are stored on the device and considered valid by the server for a set length of time. This provides a flexible method to balance usability with extreme security.

Session-Based Key Exchange—Each synchronization session generates new encryption keys to ensure security. If a malicious party manages to eavesdrop and somehow ascertain a session key, it will only be valid for that session. Given the nature of synchronization sessions, i.e. typically short and frequent, this makes it difficult to compromise the encryption in a meaningful way.

Theft/Loss Protection—The present invention provides the capability to remotely and automatically deactivate devices and destroy data. System administrators can configure varying levels of data elimination:

Lock out the device so it cannot sync;
Delete only email and PIM data;
Delete selected applications, files, and data;
Delete data on removable storage media; and
Kill (hard reset) the device to remove all data and apps.

These instructions can be pushed out to addressable devices, or can be configured to take place in a variety of circumstances automatically, for instance, if network login frequency is too low.

Power-on Password—Administrators can require users to use a power-on password to protect data on the device. The password strength can be set to anything from a simple four-digit PIN up to a long, case-sensitive alphanumeric string. Logon attempts can be tracked and automatically invoke a security policy (such as lockout) after a set number of failed attempts. For emergencies, locked-out phones can be enabled for 911 and inbound call use. In the event of a forgotten password, administrators also have the ability to push out a one-time use password for the user.

Automatic Deployment—The geographic dispersion of mobile computing deployments creates unique challenges for IT staff. It is very important to make installation as easy as possible for the administrator, while protecting the user from undue involvement. Frequently the handheld devices to be supported already exist due to corporate or personal purchase, and it is not possible to do the same sort of initial imaging that would have been done if they had been purchased separately. The present invention overcomes this challenge by providing a hands-off automatic deployment option so that users can easily self-install without sending their devices to IT.

Default User Profile—setup a default profile for new users. This enables a new user to begin synchronizing immediately. Combined with the user auto-discovery function, this allows for new users to quickly and easily start synchronizing without any administrator intervention. Custom user settings or assignment to a group profile can take place at a later time.

Advanced User Management—The management module is able to import user lists and user group assignments from existing directory services. This prevents duplicate administrative effort and decreases error potential and offers a variety of integration options for user list management, as listed below (multiple sources can be used simultaneously):

Active Directory
Any other LDAP-compliant source
Windows NT domains
Text or other database sources It is to be understood that the phraseology and terminology employed herein are for the purpose of description, and should not be regarded as limiting.

It is important, therefore, that the scope of the invention is not construed as being limited by the illustrative embodiments set forth herein. Other variations are possible within the scope of the present invention as defined in the appended claims and their equivalents.

We claim:

1. A method of transmitting data between mobile devices and a client computer or client network of computers, comprising:

installing an internal monitor to serve as a representative application or device to communicate with the client computer or client network of computers to determine if data is available for transmission to mobile devices, and installing an internal monitor on each of the mobile devices to serve as a representative application to determine if data is available for transmission from the mobile devices;

determining, by an internal monitor, that a client computer is interested in transmitting data to a mobile device or a mobile device is interested in transmitting data to a client computer, the client computer paired to the mobile device;

responsive to said determining, checking with a wireless gateway, provided to communicate with the mobile devices and with the internal monitors, to determine whether the mobile device or client computer is available to conduct a live communication session via the wireless gateway, said checking including the wireless gateway querying the mobile device or internal monitor;

responsive to said checking, if the mobile device and the client computer are available to conduct a live communication session at that moment, then the wireless gateway enables either transmitting data from the client computer to the mobile device or from the mobile device to the client computer without storing the data on the wireless gateway;

otherwise, if either the mobile device or the client computer is not available the client computer or mobile device keeps the data on hold.

2. A method of transmitting data according to claim 1, wherein the data being transmitted is email that is addressed to the paired device.

3. A method of transmitting data according to claim 1, wherein the mobile device or client computer retries periodically until succeeding to transmit the data.

4. A method of transmitting data according to claim 1, wherein the wireless gateway notifies the mobile device or client computer that is keeping the data on hold when the mobile device or client computer becomes available to establish direct communications.

5. A method of transmitting data according to claim 1, wherein the internal monitor to communicate with the client computer or client network is represented by a data center server that accesses a web email server.

6. A method of transmitting data according to claim 5, wherein the data center server queries the web email server periodically and attempts to initiate a communication session with the mobile devices if email is available for the mobile devices.

7. A method of transmitting data according to claim 1, wherein the wireless gateway only serves registered users.

8. A method of transmitting data according to claim 1, wherein email attachments are removed from emails and not transmitted responsive to a request of one of the mobile device and diem computer.

9. A method of transmitting data according to claim 1, wherein emails larger than a pre-selected size are truncated responsive to a request of one of the mobile device and client computer.

10. A system for transmitting data between mobile devices and a client computer or client network of computers, comprising:

an internal monitor serving as a representative application or device to communicate with the client computer or client network of computers to determine if data is available for transmission, and an internal monitor on each of the mobile devices to serve as a representative application to determine if data is available for transmission from the mobile devices;

a wireless gateway that communicates with the mobile devices and with the internal monitors;

wherein when determined, by an internal monitor, that a mobile device is interested in transmitting data to a client computer or a client computer is interested in transmitting data to a mobile device, the client computer paired to the mobile device, the mobile device or client computer are adapted to check with the wireless gateway to determine whether the mobile device or client computer is available to conduct a live communication session via the wireless gateway the checking including the wireless gateway querying the mobile device or internal monitors;

responsive to the checking, if the mobile device and the client computer are available to conduct a live communication session at that moment, then the wireless gateway enables either transmitting data from the client computer to the mobile device or from the mobile device to the client computer, without storing the data on the wireless gateway;

otherwise, if the mobile device or client computer is not available the mobile device or client computer keeps the data on hold.

\* \* \* \* \*